UNITED STATES PATENT OFFICE.

SOLOMON W. YOUNG, OF PROVIDENCE, RHODE ISLAND, ASSIGNOR TO HIMSELF AND CHARLES T. PLACE, OF SAME PLACE.

IMPROVEMENT IN THE MANUFACTURE OF STEEL.

Specification forming part of Letters Patent No. 49,050, dated July 25, 1865.

*To all whom it may concern:*

Be it known that I, SOLOMON W. YOUNG, of Providence, in the county of Providence and State of Rhode Island, have invented a new and useful Improvement in the Manufacture of Steel; and I do hereby declare that the following is a full, clear, and exact description thereof, which will enable those skilled in the art to make and use the same.

This invention relates to a process which is divided in three different manipulations, whereby steel can be made by mixing cast-iron and wrought-iron together.

It is a well-known fact that steel holds a medium position between bar and cast iron in composition and in most of its properties, and many attempts have been made to make steel by mixing bar-iron and cast-iron together, but all such attempts, as far as I know, have failed to produce the desired result.

My process is divided in the three following manipulations: First, I melt a quantity of cast-iron and pour it into cold water; second, after the cast-iron has cooled off I remove it from the water, mix it with a quantity of bar or wrought iron, melt the mixture, and pour it again into water, as before; third, when the mixture of cast and wrought iron has cooled off I remove it from the water, melt it again, and pour it into molds or ingots, when it is ready for hammering or rolling.

The proportion in which I mix the cast and wrought iron together depends entirely upon the nature of said ingredients, and it must be determined at the beginning of the operation by practical experiments.

When properly proportioned the steel produced by my process is equal to the best cast-steel, and it can be used for knives, chisels, turning-tools, or, in fact, for all articles where cast-steel is now used, and my steel can be produced with comparatively little labor and expense.

I claim as new and desire to secure by Letters Patent—

The within-described process for manufacturing steel, composed of three manipulations, substantially as set forth.

SOLOMON W. YOUNG.

Witnesses:
 HENRY MARTIN,
 ALBERT M. HEWITT.